(12) United States Patent
Dupont

(10) Patent No.: US 10,209,008 B2
(45) Date of Patent: Feb. 19, 2019

(54) TWO-PHASE HEAT TRANSFER DEVICE

(71) Applicant: EURO HEAT PIPES, Nivelles (BE)

(72) Inventor: Vincent Dupont, Etterbeek (BE)

(73) Assignee: EURO HEAT PIPES, Nivelles (BE)

( * ) Notice: Subject to any disclaimer, the term of this patent is extended or adjusted under 35 U.S.C. 154(b) by 80 days.

(21) Appl. No.: 14/893,877

(22) PCT Filed: May 28, 2014

(86) PCT No.: PCT/EP2014/061163
§ 371 (c)(1),
(2) Date: Nov. 24, 2015

(87) PCT Pub. No.: WO2014/191512
PCT Pub. Date: Dec. 4, 2014

(65) Prior Publication Data
US 2016/0116226 A1    Apr. 28, 2016

(30) Foreign Application Priority Data

May 29, 2013 (FR) ...................... 13 54890

(51) Int. Cl.
*F28D 15/02* (2006.01)
*F28D 15/04* (2006.01)
(Continued)

(52) U.S. Cl.
CPC ....... *F28D 15/025* (2013.01); *B60H 1/00492* (2013.01); *B60H 1/3202* (2013.01);
(Continued)

(58) Field of Classification Search
CPC . F28D 15/025; B60H 1/00492; B60H 1/3202; B65D 88/34; B65D 88/36;
(Continued)

(56) References Cited

U.S. PATENT DOCUMENTS 1,590,877 A * 6/1926 Black ..................... B65D 90/42
220/216
2,907,923 A * 10/1959 Short ....................... H05F 3/02
220/216
(Continued)

FOREIGN PATENT DOCUMENTS

EP    1607707 A1 * 12/2005 ......... F28D 15/0266
FR    2135031 A1    12/1972
(Continued)

*Primary Examiner* — Keith M Raymond
*Assistant Examiner* — Miguel A Diaz
(74) *Attorney, Agent, or Firm* — Seed IP Law Group LLP

(57) ABSTRACT

A two-phase heat transfer device that is capillary-driven or gravity-driven, has a two-phase working fluid contained in a closed general circuit, including an evaporator, a condenser, a reservoir having an inner volume with a liquid portion and a gas portion, a first vapor communication circuit, and a second liquid phase communication circuit. The reservoir comprises a plurality of floating bodies separating the liquid portion from the gas portion, by means of which the heat exchanges between the liquid portion and the gas portion are slowed down, which allows to diminish the effect of movement of the liquid portion or of an influx of cold or warm liquid into the reservoir.

20 Claims, 2 Drawing Sheets

(51) Int. Cl.
*F28D 15/00* (2006.01)
*F25B 23/00* (2006.01)
*B60H 1/00* (2006.01)
*B60H 1/32* (2006.01)

(52) U.S. Cl.
CPC .............. *F25B 23/00* (2013.01); *F25B 23/006* (2013.01); *F28D 15/043* (2013.01); *F28F 2265/12* (2013.01)

(58) Field of Classification Search
CPC .......... B65D 90/42; B65D 90/52; F25B 23/00; F25B 23/006; F28F 2265/12
USPC .......... 165/104.21, 104.22, 104.24; 220/578, 220/216, 218, 734
See application file for complete search history.

(56) References Cited

U.S. PATENT DOCUMENTS

| | | | | |
|---|---|---|---|---|
| 3,346,138 A * | 10/1967 | Tubbs | E03B 11/00 | 220/216 |
| 3,366,266 A * | 1/1968 | Heartstedt | B65D 88/34 | 220/216 |
| 3,401,818 A * | 9/1968 | Reinhold | B65D 88/36 | 220/216 |
| 3,454,180 A * | 7/1969 | Schumacher | B65D 90/42 | 220/216 |
| 3,687,329 A * | 8/1972 | Baum | A62C 3/06 | 169/57 |
| 3,784,050 A * | 1/1974 | Pollack | B60K 15/077 | 220/218 |
| 3,993,214 A * | 11/1976 | Usab | B65D 88/36 | 220/218 |
| 3,998,204 A * | 12/1976 | Fuchs | B65D 88/36 | 126/565 |
| 4,120,172 A * | 10/1978 | Pierce | F25B 1/00 | 165/104.31 |
| 4,329,918 A * | 5/1982 | Kuhtreiber | B65D 90/42 | 220/216 |
| 4,373,462 A * | 2/1983 | Fish | B63B 35/285 | 114/256 |
| 4,494,595 A * | 1/1985 | Schmid | F28D 15/0266 | 165/104.22 |
| 4,537,211 A * | 8/1985 | Almeida | B65D 88/08 | 137/1 |
| 4,899,810 A * | 2/1990 | Fredley | B64G 1/506 | 165/104.14 |
| 4,957,157 A * | 9/1990 | Dowdy | B64G 1/50 | 165/104.26 |
| 5,203,399 A * | 4/1993 | Koizumi | F25B 23/006 | 165/104.22 |
| 5,257,660 A * | 11/1993 | Cargile | F24J 2/32 | 165/104.22 |
| 5,531,075 A * | 7/1996 | Behringer | B01J 19/16 | 220/216 |
| 5,816,313 A * | 10/1998 | Baker | F16K 15/048 | 137/519.5 |
| 5,944,092 A * | 8/1999 | Van Oost | F28D 15/043 | 165/104.24 |
| 6,205,803 B1 * | 3/2001 | Scaringe | F25B 5/02 | 165/104.33 |
| 6,220,469 B1 * | 4/2001 | Basseches | B65D 88/34 | 220/216 |
| 6,840,304 B1 * | 1/2005 | Kobayashi | B01D 3/007 | 165/104.25 |
| 6,865,897 B2 * | 3/2005 | Jibb | F25B 23/006 | 165/104.26 |
| 6,889,754 B2 * | 5/2005 | Kroliczek | F28D 15/043 | 165/104.11 |
| 6,948,556 B1 * | 9/2005 | Anderson | F28D 15/0266 | 165/104.26 |
| 6,981,543 B2 * | 1/2006 | Chesser | F28D 15/043 | 165/104.13 |
| 6,990,816 B1 * | 1/2006 | Zuo | B64G 1/50 | 62/3.7 |
| 7,013,956 B2 * | 3/2006 | Thayer | F25B 23/006 | 165/104.25 |
| 7,061,446 B1 * | 6/2006 | Short, Jr. | H01Q 1/02 | 165/139 |
| 7,549,461 B2 * | 6/2009 | Kroliczek | F25B 23/006 | 165/104.21 |
| 7,748,436 B1 * | 7/2010 | Anderson | F28D 15/0266 | 165/104.21 |
| 8,047,268 B1 * | 11/2011 | Kroliczek | F28D 15/043 | 165/104.21 |
| 8,235,241 B2 * | 8/2012 | Ramsay | B60K 15/077 | 220/216 |
| 8,393,486 B2 * | 3/2013 | Cap | B65D 88/36 | 220/216 |
| 8,567,486 B1 * | 10/2013 | Wolf, Sr. | F28D 15/0266 | 165/104.22 |
| 8,616,398 B2 * | 12/2013 | Riordan | B65D 90/38 | 169/66 |
| 8,708,190 B2 * | 4/2014 | Chun | B65D 90/52 | 220/563 |
| 8,857,651 B2 * | 10/2014 | Stelzl | A62C 3/06 | 141/1 |
| 9,146,059 B2 * | 9/2015 | Hoang | F28D 15/043 | |
| 9,273,887 B2 * | 3/2016 | Kroliczek | | |
| 2001/0013366 A1 * | 8/2001 | Spickelmire | B60K 15/077 | 137/574 |
| 2002/0195242 A1 * | 12/2002 | Garner | F28D 15/043 | 165/274 |
| 2003/0218016 A1 * | 11/2003 | Iskierka | A47G 19/2211 | 220/216 |
| 2004/0134647 A1 * | 7/2004 | Sienel | F24D 17/02 | 165/236 |
| 2004/0134916 A1 * | 7/2004 | Bambacigno | B60P 3/2235 | 220/563 |
| 2005/0279491 A1 * | 12/2005 | Thome | F28D 15/0266 | 165/272 |
| 2006/0288870 A1 * | 12/2006 | Kang | B01D 53/261 | 96/6 |
| 2007/0194057 A1 * | 8/2007 | Gehl | G01F 23/00 | 222/386 |
| 2009/0078705 A1 * | 3/2009 | Ramsay | B60K 15/077 | 220/562 |
| 2009/0314472 A1 * | 12/2009 | Kim | F28D 15/043 | 165/104.26 |
| 2010/0294761 A1 * | 11/2010 | Riordan | B65D 90/38 | 220/88.1 |
| 2011/0079022 A1 * | 4/2011 | Ma | F25B 21/02 | 62/3.2 |
| 2012/0137718 A1 * | 6/2012 | Uchida | F28D 15/043 | 62/259.2 |
| 2012/0304372 A1 * | 12/2012 | Wiebe | B65D 88/34 | 4/498 |
| 2013/0233521 A1 * | 9/2013 | Uchida | F28D 15/0266 | 165/104.26 |
| 2015/0060447 A1 * | 3/2015 | Alirol | B65D 88/36 | 220/218 |
| 2015/0083373 A1 | 3/2015 | Dupont | | |
| 2015/0114605 A1 * | 4/2015 | Dupont | F28D 15/06 | 165/104.26 |
| 2015/0210563 A1 * | 7/2015 | Tomlin | C02F 1/22 | 210/774 |
| 2015/0338171 A1 * | 11/2015 | Torres Sep Iveda | F28D 15/04 | 165/104.26 |
| 2015/0369541 A1 * | 12/2015 | Dupont | F28D 15/025 | 165/104.26 |
| 2016/0047605 A1 * | 2/2016 | Mishkinis | F28D 15/0266 | 165/104.25 |
| 2016/0101932 A1 * | 4/2016 | Stabler | B65D 88/36 | 220/216 |
| 2016/0161132 A1 * | 6/2016 | Kuo | F24F 5/0021 | 62/438 |

(56) References Cited

U.S. PATENT DOCUMENTS

2016/0363382 A1* 12/2016 Derevyagin ............ F28F 13/06
2017/0190505 A1*  7/2017 Nekipelov ............. B65D 88/34

FOREIGN PATENT DOCUMENTS

FR          2949642 A1    3/2011
WO    WO 2005108299 A1 * 11/2005  ........... B01D 1/0005

* cited by examiner

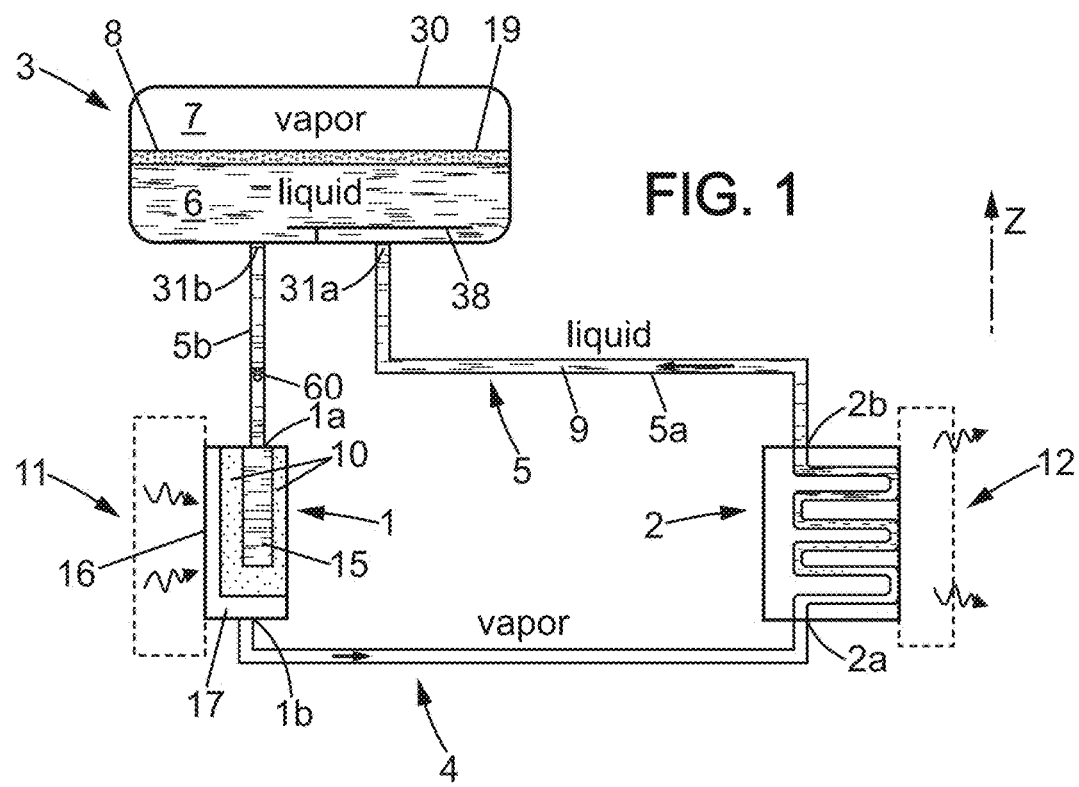

TWO-PHASE HEAT TRANSFER DEVICE

BACKGROUND

Technical Field

The present invention relates to two-phase heat transfer devices, in particular mechanically passive devices with a two-phase fluid loop that are capillary-driven or gravity-driven.

Description of the Related Art

It is known from document FR-A-2949642 that such devices are used as cooling means for electrotechnical power converters.

These devices can be temperature-controlled by controlling the pressure in the reservoir. This control can be active (electric heating resistor) or entirely passive (introduction of an auxiliary gas into the reservoir).

However, it has appeared that the startup phases were particularly subject to problems for high thermal power levels, drying-out of the capillary wick can occur resulting in a startup failure.

Moreover, if the device is subjected to accelerations, a phenomenon known as 'cold shock' may occur in the reservoir which suddenly lowers the pressure and degrades performance.

Furthermore, strong fluctuations in the thermal load can lead to operational instability of the two-phase loop.

There therefore appeared a need to increase on the one hand the startup reliability and on the other hand the operational reliability of such loops under conditions of thermal loads presenting strong fluctuations.

BRIEF SUMMARY

To this end, the object of the invention is a capillary-driven heat transfer device, suitable for extracting heat from a heat source and for restoring this heat to a cold source by means of a two-phase working fluid contained in a closed general circuit, comprising:

at least one evaporator (1), having an inlet and an outlet,
at least one condenser (2),
a reservoir (3) having an inner volume with a liquid portion and a gas portion, and at least one inlet and/or outlet port (31; 31a, 31b),
a first communication circuit (4), for fluid mainly in the vapor phase, connecting the outlet of the evaporator to an inlet of the condenser,
a second communication circuit (5), for fluid mainly in the liquid phase, connecting an outlet of the condenser to the reservoir and to the inlet of the evaporator,
wherein the reservoir (3) comprises a plurality of floating bodies separating the liquid portion from the gas portion, by means of which the heat exchanges between the liquid portion and the gas portion are slowed down.

Thanks to these arrangements, the floating bodies form a thermal barrier which slows down the heat exchanges between the liquid portion and the gaseous portion, which has a number of beneficial effects explained below.

Indeed, the two-phase loop can be subjected to strong fluctuations in thermal load, and therefore the flow of liquid entering the liquid part can have on the one hand a variable and even chaotic flow rate and on the other hand a temperature significantly different from that of the reservoir.

First of all it is possible to diminish the effect of an influx of cold liquid into the reservoir. Such an influx of cold liquid can lead to a cold shock effect, namely a sharp decrease in the temperature of the upper surface of the liquid in the reservoir which results in a pressure drop and a sudden increase in load losses that are detrimental to the operation of the loop. Thanks to the presence of the floating bodies, the temperature fluctuation of the surface of the liquid phase will be much slower. This effect is particularly noticeable if the reservoir is pressure controlled thermally by means of a heating cartridge.

In other circumstances, for example in the case of pressurization by the intentional introduction into the reservoir of an inert auxiliary gas, the influx of liquid can be at a temperature substantially higher than the average temperature of the reservoir which can lead to a hot shock effect, namely a rapid increase in the temperature of the upper surface of the liquid in the reservoir which results in an increase in pressure and temperature, with operating conditions potentially close to the maximum temperature and pressure limits. There too, the presence of the floating bodies acts as a thermal barrier to slow down the fluctuations in the gas-liquid surface temperature (temperature of the upper surface of the liquid in the reservoir).

And finally, significant fluid movement can occur in the reservoir when the device is subjected to accelerations, for example if it is on board a transport vehicle. This can lead to a mixing effect in the reservoir, which can result in rapid and undesirable fluctuations of the temperature of the surface of the liquid in contact with the gaseous phase in the reservoir, and a resulting operational instability of the two-phase loop. Here again, the floating bodies form a barrier which dampens the mixing effect in the liquid.

In various embodiments of the invention, one or more of the following arrangements can furthermore optionally be applied:

- the plurality of floating bodies may form a plurality of superimposed layers; This provides a good efficacy of the thermal barrier while still allowing liquid-gas exchanges;
- said floating bodies are connected to each other by a flexible structure; This prevents one or more floating bodies from remaining stuck on a wall or from becoming separated from the other floating bodies;
- the reservoir comprises a lower grid and an upper grid, arranged respectively away from the bottom wall and away from the top wall of the reservoir, causing these two grids to prevent the floating bodies from crossing them and forming in this way lower and upper limits for the movement of the floating bodies inside the reservoir; This prevents one or more floating bodies from getting stuck on the bottom wall or on the top wall;
- all of said floating bodies have substantially the same shape; which represents an easy solution for industrialization, as only one type of element is used which is counted or weighed to determine the necessary quantity;
- said floating bodies are made of a material chosen among stainless steel, Teflon, borosilicate, carbon, ceramics; whereby a chemically neutral material is chosen which does not age unfavorably over time;
- said floating bodies can have a spherical shape, preferably with a diameter that is between 0.5 and 10 mm; which facilitates the spatial rearrangement of the floating bodies in the event of a change in the geometry of the liquid surface;
- the volume occupied by the plurality of said floating bodies is between 3% and 12% of the total volume of the reservoir; whereby a sufficient and optimum thickness of floating bodies is obtained, in particular for a reservoir which has usual dimensions for this type of application;

the reservoir comprises an input stream deflector near the inlet port; This prevents the input stream from having a direct influence on the layer of floating bodies;

the evaporator comprises a microporous mass suitable for performing the capillary pumping of fluid in the liquid phase; so that a capillary-driven solution is used without calling upon the effect of gravity for the pumping function; as a result of which the device can be used in a microgravity environment;

the device can additionally comprise a non-return member in the form of a float fitted between the inner volume of the reservoir and the microporous mass of the evaporator, and arranged to prevent the liquid present in the evaporator from moving towards the inner volume of the reservoir; which improves the reliability of the startup of the two-phase loop;

the device being mainly subject to gravity, the evaporator can be placed below the condenser and the reservoir, so that gravity is used to move the liquid towards the evaporator; this represents an alternative to capillary pumping.

BRIEF DESCRIPTION OF THE DRAWINGS

Other aspects, aims and advantages of the invention will become apparent upon reading the following description of several embodiments of the invention, given as non-limiting examples, with reference to the accompanying drawings in which:

FIG. 1 is a general view of a device according to an embodiment of the invention, FIG. 2 shows in more detail the reservoir of the device of FIG. 1.

Figure 3:
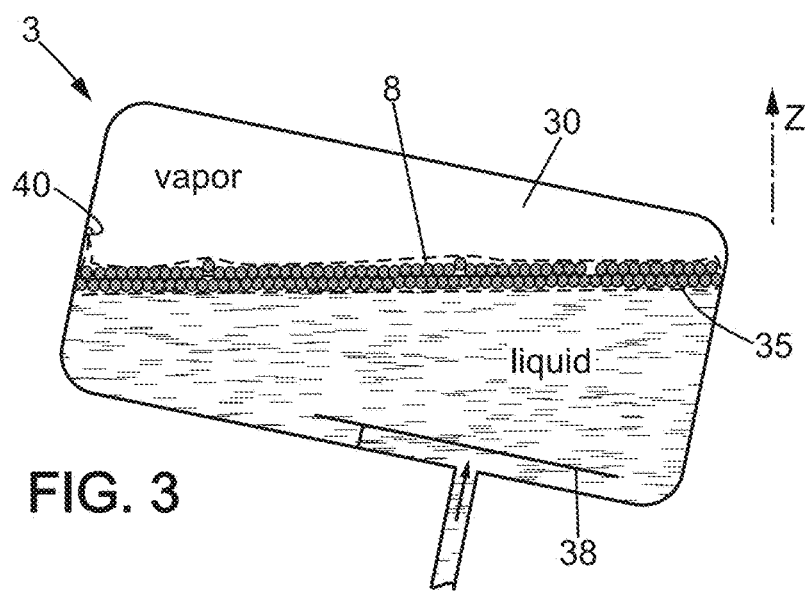
FIG. 3 shows a variant of the reservoir of FIG. 2.

In the different figures, the same references refer to identical or similar items.

DETAILED DESCRIPTION

FIG. 1 shows a capillary-driven heat transfer device, with a two-phase fluid loop. The device comprises an evaporator 1, having an inlet 1a and an outlet 1b, and a microporous mass 10 suitable for performing capillary pumping. For this purpose, the microporous mass 10 surrounds a blind central longitudinal recess 15 communicating with the inlet 1a in order to receive working fluid 9 in a liquid state from a reservoir 3.

The evaporator 1 is thermally coupled with a heat source 11, such as for example an assembly comprising electronic power components or any other component generating heat, by Joule effect for example, or by any other method.

Under the effect of the contribution of calories at the contact 16 with the microporous mass filled with liquid, fluid passes from the liquid state to the vapor state and is evacuated through the transfer chamber 17 and through a first communication circuit 4 which conveys said vapor to a condenser 2 which has an inlet 2a and an outlet 2b.

In the evaporator 1, the cavities freed by the evacuated vapor are filled by liquid drawn in by the microporous mass 10 from the aforementioned central recess 15; this is the capillary pumping phenomenon as is well known per se.

Inside of said condenser 2, heat is released by the fluid in the vapor phase to a cold source 12, which causes a cooling of the vapor fluid and its change of phase to the liquid phase, that is to say its condensation.

At the condenser 2, the temperature of the working fluid 9 is lowered below its liquid-vapor equilibrium temperature, which is also known as 'subcooling,' so that the fluid cannot revert to the vapor state without a significant heat input.

The vapor pressure pushes the liquid in the direction of the outlet 2b of the condenser 2 which opens onto a second communication circuit 5, which is also connected to the reservoir 3. Said second communication circuit 5 can comprise two separate portions 5a,5b as will be seen below.

The second communication circuit 5 comprises working fluid mainly in the liquid phase, whereas the first communication circuit 4 comprises fluid mainly in the vapor phase.

The reservoir 3 has at least one inlet and/or outlet port 31, here in the case of FIG. 1 a separate inlet port 31a and a separate outlet port 31b, and the reservoir 3 has an inner volume 30, filled with heat transfer fluid 9 in two-phase form. The working fluid 9 can be for example ammonia or any other suitable fluid, however preferentially methanol can be chosen. The working fluid 9 is in a two-phase form in the reservoir 3 partly in the liquid phase 6 and partly in the vapor phase 7. In an environment where gravity is exerted (vertically according to Z), the gaseous phase part 7 is situated above the liquid phase part 6 and a liquid-vapor interface 19 separates the two phases (upper surface of the liquid in the reservoir).

It is the temperature of this separation surface 19 which determines the pressure in the loop, this pressure corresponds to the saturation pressure of the fluid at the temperature prevailing at the separation surface 19, according to the bijective relationship linking Psat and Tsat in conditions of saturation.

It should be noted that, in cases where the heat transfer device is located in a moving vehicle, the reservoir can be subjected to a wide range of inertial forces. Moreover, the reservoir can find itself tilted with regard to its normal reference position, as illustrated in FIG. 3.

Advantageously according to the invention, a plurality of floating bodies 8 are arranged inside the reservoir. These floating bodies 8 position themselves naturally in the upper part of the liquid portion, globally at the interface between the liquid portion 6 and the gas portion 7.

Their buoyancy in relation to the liquid of the working fluid must be sufficient, and consequently their density must be substantially less than the density of the liquid. According to the chosen material, these floating bodies 8 can therefore be full or hollow, the hollow internal volume being adapted in relation to the desired buoyancy.

Preferably a material will be chosen that is chemically inert with regard to the working fluid. Preferably can be envisaged stainless steel, Teflon, borosilicate, carbon, ceramics, or other materials.

These floating bodies are designed to resist without bursting a relatively low external pressure for example up to a few hundredths of atmosphere in the case of the use of a low pressure fluid such as methanol at −50° C. or during the initial vacuum creation phase at the filling of the system.

Moreover, these floating bodies are designed to support the maximum pressure possibly prevailing in the two-phase loop at a maximum temperature and thermal load, that can go up to around 10 bars.

Advantageously, a sufficient number of floating bodies 8 are provided so that they form a plurality of superimposed layers, as is shown in particular in FIGS. 2 and 3, as a result of which the floating bodies can reconfigure themselves spatially according to the surface and the geometry of the liquid-gas interface. For example, when the reservoir is tilted (FIG. 3), the surface of the liquid-gas interface is higher and consequently, the floating bodies reconfigure themselves spatially to occupy all of this surface but with a thickness that is slightly inferior.

In other words, the set of floating bodies 8 forms a variable-geometry thermal barrier.

According to the application and the shape of the reservoir, a number of shapes can be chosen for the floating bodies. Advantageously, a spherical shape can be chosen, whereby the plurality of floating bodies will form a carpet of floating beads.

For example, a diameter can be chosen for the beads (balls) that is between 0.5 mm and 10 mm, or preferably between 2 mm and 5 mm.

According to an advantageous aspect, all of the floating bodies can substantially have the same shape, spherical or otherwise. In this case only one type is used which is counted or weighed to obtain the necessary quantity for insertion into the reservoir.

Alternatively, when for example the reservoir can be in the form of a cylinder of a certain length and with an axis A, the floating bodies can be chosen as round rods with a small diameter extending parallel to the axis A over the whole length of the cylinder, and arranged next to each other.

The reservoir 3 serves as an expansion tank for the working fluid of the two-phase loop and for pressure regulation if required. Consequently, the liquid portion in the reservoir alternates between a non-null minimum volume in the reservoir and a maximum volume which does not however occupy the entire inner volume 30 of the reservoir 3.

In order to prevent the floating bodies 8 from sticking to the walls, in particular the top wall 32 and the bottom wall 33 of the reservoir, horizontal grids can be provided, namely an upper grid 82, and a lower grid 83, their position being compatible with the minimum volume and the maximum volume of the liquid portion in the reservoir as mentioned above.

The mesh of the grids is sufficiently small to prevent the floating bodies from crossing the grids. Care is taken to arrange the lower grid 83 a little below the minimum volume of liquid and the upper grid 82 a little above the maximum volume of liquid in the reservoir.

For systems subjected to violent or periodical longitudinal accelerations, vertical grids 13 (see FIG. 4) can prevent rapid movement of the liquid which could disturb the efficacy of the floating bodies. The free surface is therefore compartmented to obtain this anti-sloshing function.

The volume occupied by the plurality of said floating bodies can advantageously be between 3% and 12% of the total volume of the reservoir, in order to obtain a sufficient and optimum thickness of floating bodies, in particular for a reservoir having usual dimensions for this type of application, namely three dimensions that are relatively close to each other.

According to an optional feature, the floating bodies can be wrapped in a flexible structure for example of the net 35 or gauze type as illustrated in FIG. 3. In this case, at least one extremity of the envelope containing the floating bodies is attached to a side of the reservoir at an attachment point 40.

It is possible to have more than one attachment point, provided that the flexible structure is stretchable or presents a certain length of slack. The floating bodies are captive inside the net, which prevents one or more floating bodies from becoming separated from the group.

Moreover, advantageously according to the invention, the reservoir comprises an input stream deflector 38 near the inlet port 31a or near the inlet/outlet port 31 according to the configuration of the second conduit.

This input stream deflector 38 prevents a rapid arrival of liquid into the reservoir from creating a current in the liquid phase directed directly towards the liquid-gas interface. This deflector can take the form of a U section oriented downwards, or of a bowl or of any other shape creating a sufficient deviation of the trajectory of the liquid entering vertically towards the top.

Figure 4:
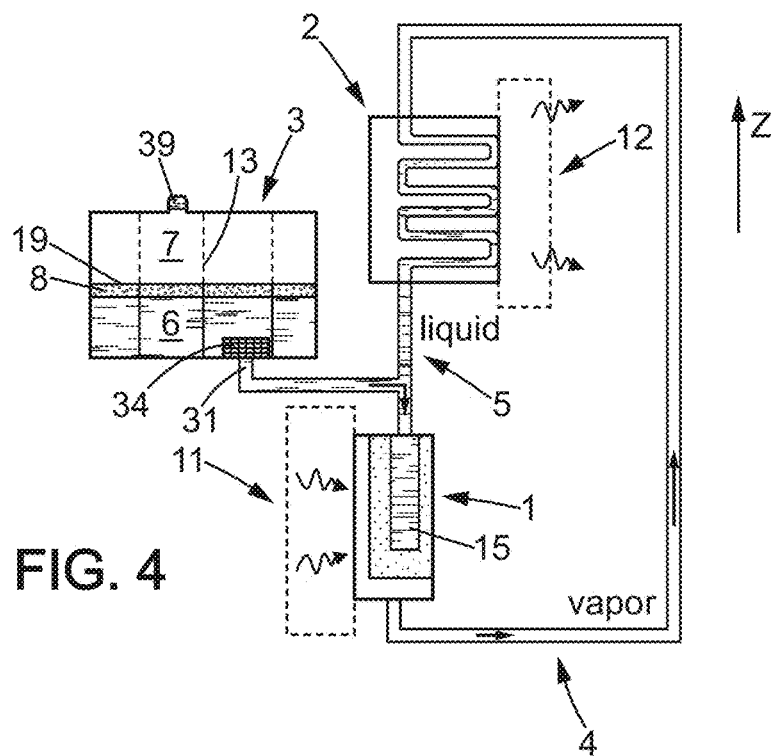
FIG. 4 shows a second embodiment of the device of the invention, in which mainly gravity is used to perform the pumping of the two-phase loop.

At the inlet port 31a and/or inlet/outlet port 31 of the reservoir, a filter 34 can optionally be provided, illustrated in FIG. 4, to prevent one or more floating bodies from entering the liquid conduit leading to the evaporator.

The filter 34 can be for example a steel-wool type structure, or a sponge-type structure or a macroporous structure.

There can further be provided a filler port 39 closed after initial filling with working fluid.

The first and second fluid communication circuits 4,5 are preferably tubular conduits, but they could be other types of conduits or fluid communication channels (conduits that are rectangular, flexible, etc.).

Similarly, the second fluid communication circuit 5 can be in the form of two separate independent conduits 5a, 5b (see FIG. 1) or a single conduit with a 'T' coupling 5c (see FIG. 4).

These conduit configurations remain relevant when a number of evaporators and/or a number of condensers are connected in parallel.

In all cases, the second fluid communication circuit 5 connects the outlet of the condenser 2b to the inlet of the evaporator 1a, either indirectly by going through the reservoir (in the case of two independent conduits) or directly (in the case of a single conduit with a 'T' coupling).

The device can additionally comprise a non-return member 60 in the form of a float arranged between the inner volume of the reservoir and the evaporator. This non-return member forms a valve aimed at preventing liquid present in the evaporator from moving to the inner volume of the reservoir, in particular at the moment of a sharp startup.

Advantageously according to the invention, the device does not include any mechanical pump even though the invention does not exclude the presence of an auxiliary mechanical pump.

The invention claimed is:

1. A heat transfer device, subject to gravity, suitable for extracting heat from a heat source and for restoring this heat to a cold source by a two-phase working fluid contained in a closed general circuit, comprising:
   at least one evaporator, having an inlet and an outlet,
   at least one condenser,
   a reservoir having an inner volume filled with a working fluid in two-phase form with a liquid portion and a gas portion separated by a liquid-gas interface, and at least one inlet and/or outlet port, the reservoir serving as an expansion tank for the working fluid,
   a first communication circuit, for fluid mainly in the vapor phase, connecting the outlet of the evaporator to an inlet of the condenser,
   a second communication circuit, for fluid mainly in the liquid phase, connecting an outlet of the condenser to the reservoir and to the inlet of the evaporator, wherein:

the reservoir comprises a plurality of floating bodies separating the liquid portion from the gas portion and forming a thermal barrier, by means of which heat exchanges between the liquid portion and the gas portion are slowed down, while allowing liquid-gas exchanges at the liquid-vapor interface at saturation conditions, said floating bodies are enveloped in a net, said plurality of floating bodies forms a plurality of superimposed layers, and the net allows the floating bodies, whenever the reservoir is tilted, to reconfigure themselves spatially to occupy in a permeable manner all of the surface of the liquid-gas interface.

2. The heat transfer device according to claim 1, wherein all of said floating bodies have substantially the same shape.

3. The heat transfer device according to claim 1, wherein said floating bodies include a material chosen among stainless steel, polytetrafluorethylene, borosilicate, carbon, ceramics.

4. The heat transfer device according to claim 1, wherein said floating bodies have a spherical shape with a diameter that is between 0.5 and 10 mm.

5. The heat transfer device according to claim 1, wherein a volume occupied by the plurality of said floating bodies is between 3% and 12% of a total volume of the reservoir.

6. The heat transfer device according to claim 1, wherein the reservoir comprises an input stream deflector near the inlet port.

7. The heat transfer device according to claim 1, wherein the evaporator comprises a microporous mass suitable for performing the capillary pumping of fluid in the liquid phase.

8. The heat transfer device according claim 1, wherein the evaporator is placed below the condenser and the reservoir, so that gravity is used to move the liquid towards the evaporator.

9. A heat transfer device, mainly subject to gravity, suitable for extracting heat from a heat source and for restoring this heat to a cold source by means of a two-phase working fluid contained in a closed general circuit, comprising:

at least one evaporator, having an inlet and an outlet, at least one condenser, a reservoir having an inner volume filled with a working fluid in two-phase form with a liquid portion and a gas portion separated by a liquid-gas interface, and at least one inlet and/or outlet port, the reservoir serving as expansion tank for the working fluid, a first communication circuit, for fluid mainly in the vapor phase, connecting the outlet of the evaporator to an inlet of the condenser, a second communication circuit, for fluid mainly in the liquid phase, connecting an outlet of the condenser to the reservoir and to the inlet of the evaporator, wherein:

the reservoir comprises a plurality of floating bodies separating the liquid portion from the gas portion and forming a thermal barrier, by means of which the heat exchanges between the liquid portion and the gas portion are slowed down, while allowing liquid-gas exchanges at the liquid-vapor interface at saturation conditions, the reservoir comprises a lower grid and an upper grid, arranged respectively away from a bottom wall and away from a top wall of the reservoir, so that these two grids prevent the floating bodies from crossing them, said plurality of floating bodies forms a plurality of superimposed layers, and the floating bodies, whenever the reservoir is tilted, reconfigure themselves spatially to occupy in a permeable manner all of the surface of the liquid-gas interface.

10. The heat transfer device according to claim 9, wherein all of said floating bodies have substantially the same shape.

11. The heat transfer device according to claim 9, wherein said floating bodies are made of a material chosen among a group comprising stainless steel, polytetrafluoroethylene, borosilicate, carbon, ceramics.

12. The heat transfer device according to claim 9, wherein said floating bodies have a spherical shape, with a diameter that is between 0.5 and 10 mm.

13. The heat transfer device according to claim 9, wherein the volume occupied by the plurality of said floating bodies is between 3% and 12% of the total volume of the reservoir.

14. The heat transfer device according to claim 9, wherein the reservoir comprises an input stream deflector near the inlet port.

15. The heat transfer device according to claim 9, wherein the evaporator comprises a microporous mass suitable for performing the capillary pumping of fluid in the liquid phase.

16. The heat transfer device according to claim 9, mainly subject to gravity, wherein the evaporator is placed below the condenser and the reservoir, so that gravity is used to move the liquid towards the evaporator.

17. The heat transfer device according to claim 9, wherein the at least one inlet and/or outlet port includes an inlet port and an outlet port that are both located at the bottom wall of the reservoir.

18. The heat transfer device according to claim 9, wherein the upper grid is positioned above the liquid portion in the reservoir.

19. The heat transfer device according to claim 1, wherein the net is attached to an internal side wall of the reservoir.

20. The heat transfer device according to claim 1, wherein the reservoir includes a top wall enclosing a top of the reservoir.

* * * * *